United States Patent
Cheung et al.

(10) Patent No.: US 9,912,773 B2
(45) Date of Patent: Mar. 6, 2018

(54) SYSTEMS AND METHODS TO PRIORITIZE AND SCHEDULE NOTIFICATIONS WITH USER BEHAVIOUR AND CONTEXTUAL DATA ANALYSIS

(71) Applicant: New Asia Technology Development Limited, Hong Kong (HK)

(72) Inventors: Chi Leung Alex Cheung, Hong Kong (HK); Yu Fai Ho, Hong Kong (HK)

(73) Assignee: New Asia Technology Development Limited, Hong Kong (HK)

( * ) Notice: Subject to any disclaimer, the term of this patent is extended or adjusted under 35 U.S.C. 154(b) by 0 days.

(21) Appl. No.: 15/604,649

(22) Filed: May 24, 2017

(65) Prior Publication Data
US 2017/0346914 A1    Nov. 30, 2017

Related U.S. Application Data

(60) Provisional application No. 62/341,612, filed on May 25, 2016.

(51) Int. Cl.
| | |
|---|---|
| G06F 15/173 | (2006.01) |
| H04L 29/08 | (2006.01) |
| G06Q 10/10 | (2012.01) |
| G06F 17/30 | (2006.01) |
| H04L 29/06 | (2006.01) |

(52) U.S. Cl.
CPC ........ H04L 67/26 (2013.01); G06F 17/30575 (2013.01); G06Q 10/1093 (2013.01); H04L 67/306 (2013.01); H04L 67/42 (2013.01)

(58) Field of Classification Search
CPC .. H04L 67/306; H04L 67/42; G06F 17/30575
USPC .......................................................... 709/223
See application file for complete search history.

(56) References Cited

U.S. PATENT DOCUMENTS

| | | | |
|---|---|---|---|
| 2010/0042470 A1 | 2/2010 | Chang et al. | |
| 2014/0362712 A1* | 12/2014 | Agarwal | H04W 28/0236 370/252 |
| 2016/0055420 A1* | 2/2016 | Karanam | A61B 5/165 700/52 |

FOREIGN PATENT DOCUMENTS

CN    103617547 A    3/2014

OTHER PUBLICATIONS

Search Report issued by the Chinese Patent Office dated Oct. 14, 2016.
Search Report of counterpart European Patent Application No. 17172734.0 dated Sep. 20, 2017.

* cited by examiner

*Primary Examiner* — Phuoc Nguyen

(57) ABSTRACT

Disclosed are a system, apparatus, and method for prioritizing and scheduling of notifications to a user on a user device based on the user's behavior profile and user state. The method includes collecting user related data by a plurality of data collectors. The data may be collected by the user's device and a server connected to the user's device. The data collected by the user's device and the server may be different. The collected data is analyzed to generate user states data and user behavior data. The prioritizing and scheduling of the messages is done based on the user states data and the behavior data.

20 Claims, 16 Drawing Sheets

SYSTEMS AND METHODS TO PRIORITIZE AND SCHEDULE NOTIFICATIONS WITH USER BEHAVIOUR AND CONTEXTUAL DATA ANALYSIS

CROSS-REFERENCE TO RELATED APPLICATIONS AND PRIORITY

The present application claims priority from U.S. Application No. 62/341,612 filed on May 25, 2016.

TECHNICAL FIELD

The disclosed subject matter relates to a system and method to prioritizing and scheduling notifications, more particularly the disclosed subject matter relates to a system and method to prioritize and scheduling notifications to a user on a user device based on user behavior and contextual data analysis.

BACKGROUND

Mobile notifications are being used by on every platform. With the advent of smartphone and the notifications feature, user can have various types of notifications triggered by various conditions. Developers use mobile notifications to provide important information based on user's interests and activities. Notifications may be based on user's body condition, user's calendar, or user's news reading interests. Mobile push notifications are delivered to user without wise control. Most of the times the notifications interrupt user from focusing on current task. Distraction caused by push notifications could create serious consequences, such as, when the user is driving, distraction may lead to road accident.

There have been solutions created to take care of the disturbance caused to the user. In a solution, the user may utilize a do not disturb criteria, which the user may define for certain time, or location etc. The user may also define what kind of notifications the user may want to receive.

However, since the user may be only able to define certain types of notifications or senders of notifications, other urgent notifications that may require user's attention immediately may be missed.

Therefore, there exists a need for a solution to prioritize and schedule notifications efficiently.

SUMMARY

This summary is provided to introduce concepts related to system and method for prioritizing and scheduling notifications to a user on user's device and the concepts are further described in the detailed description. This summary is not intended to identify essential features of the claimed subject matter nor is it intended for use in determining or limiting the scope of the claimed subject matter.

In an implementation, a system for prioritizing and scheduling notifications is disclosed. The system may comprise a plurality of user devices corresponding to a user. Each user device may further comprise a plurality of user service adaptors that help in regularly collecting a first user contextual data corresponding to the user. The user device may further comprise a user device analysis engine that analyzes the first user contextual data and generates a first user states data. The user device may further comprise a memory that may have a plurality of databases and stores the first user contextual data and the first user states data separately. The user device, also may comprise a data push module that transmits the first user contextual data and the first user states data. The system, further may comprise a server that is connected to the plurality of user devices through a network. The server, may comprise a plurality of server adaptors. The server adaptors help in gathering or collecting a second user contextual data from server side corresponding to the user. The server, may further comprise a server analysis engine to analyze the second user contextual data and generate a second user states data and a user behavior data. The server may also comprise a server memory having a plurality of databases to store second user contextual data and the user behavior data separately. Further, the server may comprise a synchronizer module that receives and adds the first contextual data and the first user states data to the second contextual data and the second user states data and updates the second user contextual and states data. Server, further may comprise a notification module, to determine priority and scheduling of notifications based on the user behavior data and the user states data.

In another implementation, a method for prioritizing and scheduling is disclosed. The method may comprise collecting a first user contextual data from a plurality of user devices corresponding to a user wherein each of the plurality of user devices may comprise a plurality of user device adaptors and a second user contextual data from a plurality of server adaptors. Both the adaptors are configured to regularly collect user contextual data. The method, further may comprise combining the first user contextual data and the second user contextual data. The method may comprise step of analyzing the combined user contextual data to generate a user behavior and a user states data. Further, the method may comprise storing the combined user contextual data, the user behavior data and the user states data. Further, method may comprise of updating regularly, the combined user contextual data, the user behavior data and the user states data based on updated first contextual data and updated second contextual data and prioritizing and scheduling the notifications to the plurality of user devices based on the updated user behavior data and the user states data.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
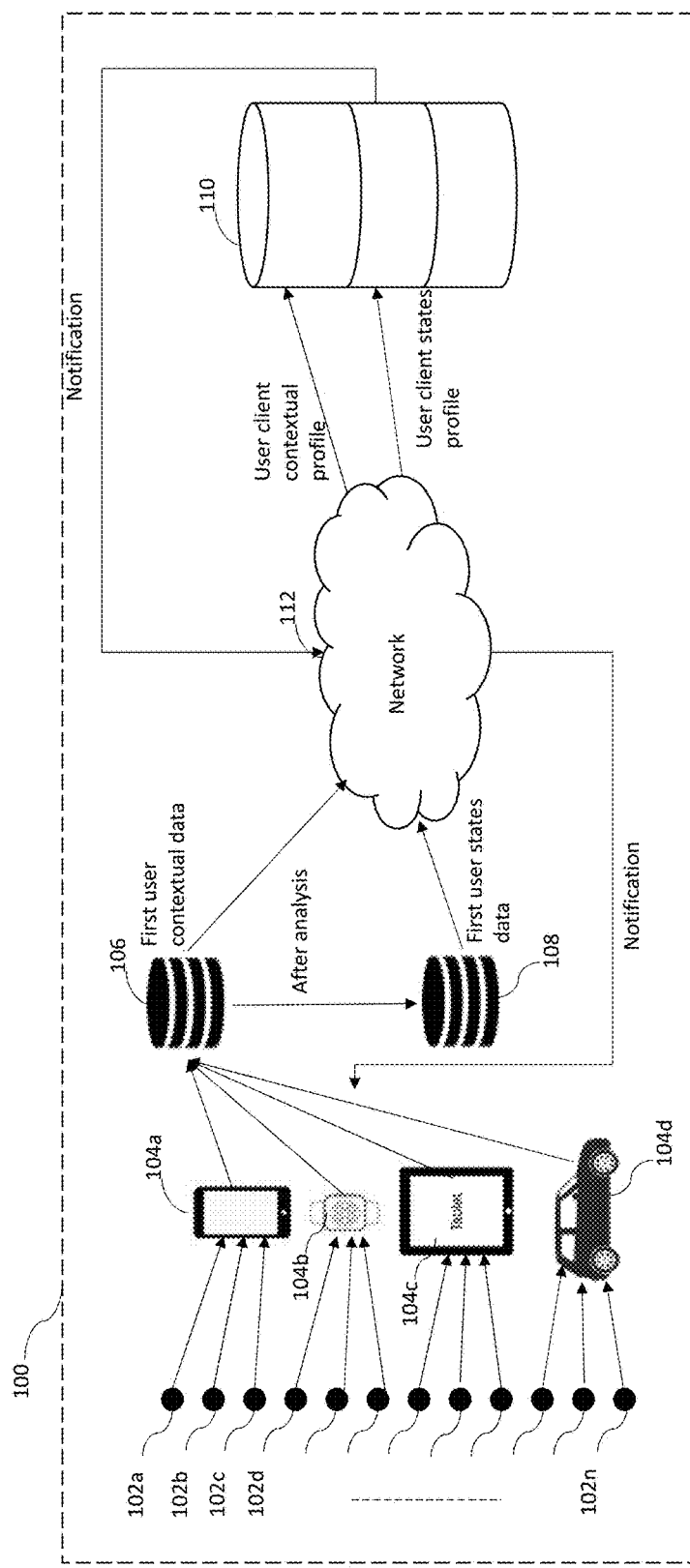
FIG. 1 illustrates a system, in accordance with aspects of the embodiments.

FIG. 1 illustrates a system 100, in accordance with aspects of the embodiments. a block diagram of a system 100 for highlighting one or more parts of communication segments between a plurality of participants in a communication network, is illustrated in accordance with an embodiment. The system 100 may include one or more of a processor, memory which includes a temporary transient (volatile) memory such as Random-Access Memory (RAM) and a computer readable medium or article (not shown in FIG. 1).

The system 100 includes a plurality of data collectors 102a-102n (collectively referred to as 102) corresponding to a plurality of user devices 104a-104d (collectively referred to as 104). Each user device 104 may obtain data from at least one of the plurality of data collectors 102. The plurality of user devices 104 may correspond to a user. Details of internal components and parts required for further processing will be disclosed in conjunction with FIG. 2. The plurality of user devices 104 collects a first user contextual data 106 which when analyzed by each of the plurality of user devices, generate a first user states data. The first user contextual data 106 and the first user states data 108 is transmitted to a server 110 over a network 112. The server 110, receives the first contextual data 106 and the first user states data 108. The server 110, also collects a second user contextual data that may be analyzed by the server 110 to generate a second user states data. The first user contextual data 106 and the second user contextual data may be merged together to update the second user contextual data. Similarly, the first user states data 108 may be merged with the second user states data to update the second user states data. The second user states data may be further updated when the server 110 again analyzes the updates second user states data. Details of internal components and parts required for further processing will be disclosed in conjunction with FIG. 3. This updated second user states data may be utilized by the server 110 to prioritize and reschedule the notifications to a user device, out of the plurality of user devices 104, as per the updated second user's states data.

In an implementation, the data collectors 102 may be various data sensors like gyroscope, accelerometer, calendar data collectors, organizer data collectors, body condition sensors like heartbeat sensors, blood pressure sensors, blood glucose sensors, location sensors like GPS collectors, LBS collectors, IPS collectors, Geolocation handler collectors, automobile data collectors like car telemetry sensors, OBD sensors, Non-OBD sensors, etc. The plurality of data collectors 102 may communicate with corresponding adaptors for transmitting the data collected for storage.

In another implementation, the plurality of user devices 104 may be a smartphone, a smart watch, a tablet computer, and in-car consoles capable of gathering multitude of user related of data.

In another implementation, the network 112 may be a wireless network, a wired network, or a combination thereof. The network 112 can be implemented as one of the different types of networks, such as intranet, local area network (LAN), wide area network (WAN), the internet, and the like. The network 112 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 112 may include a variety of network devices, including routers, bridges, servers, computing devices, storage devices, and the like.

The server 110 may include at least one processor, an input/output (I/O) interface and a memory (not shown in FIG. 1). The at least one processor may be implemented as one or more microprocessors, microcomputers, microcontrollers, digital signal processors, central processing units, state machines, logic circuitries, and/or any devices that manipulate signals based on operational instructions.

Among other capabilities, the at least one processor is configured to fetch and execute computer-readable instructions stored in the memory.

In another implementation, the user contextual data 106 may refer to elements of situational information (who, what, when, where, how, why, etc.) associated with a user directly or indirectly.

Figure 2:
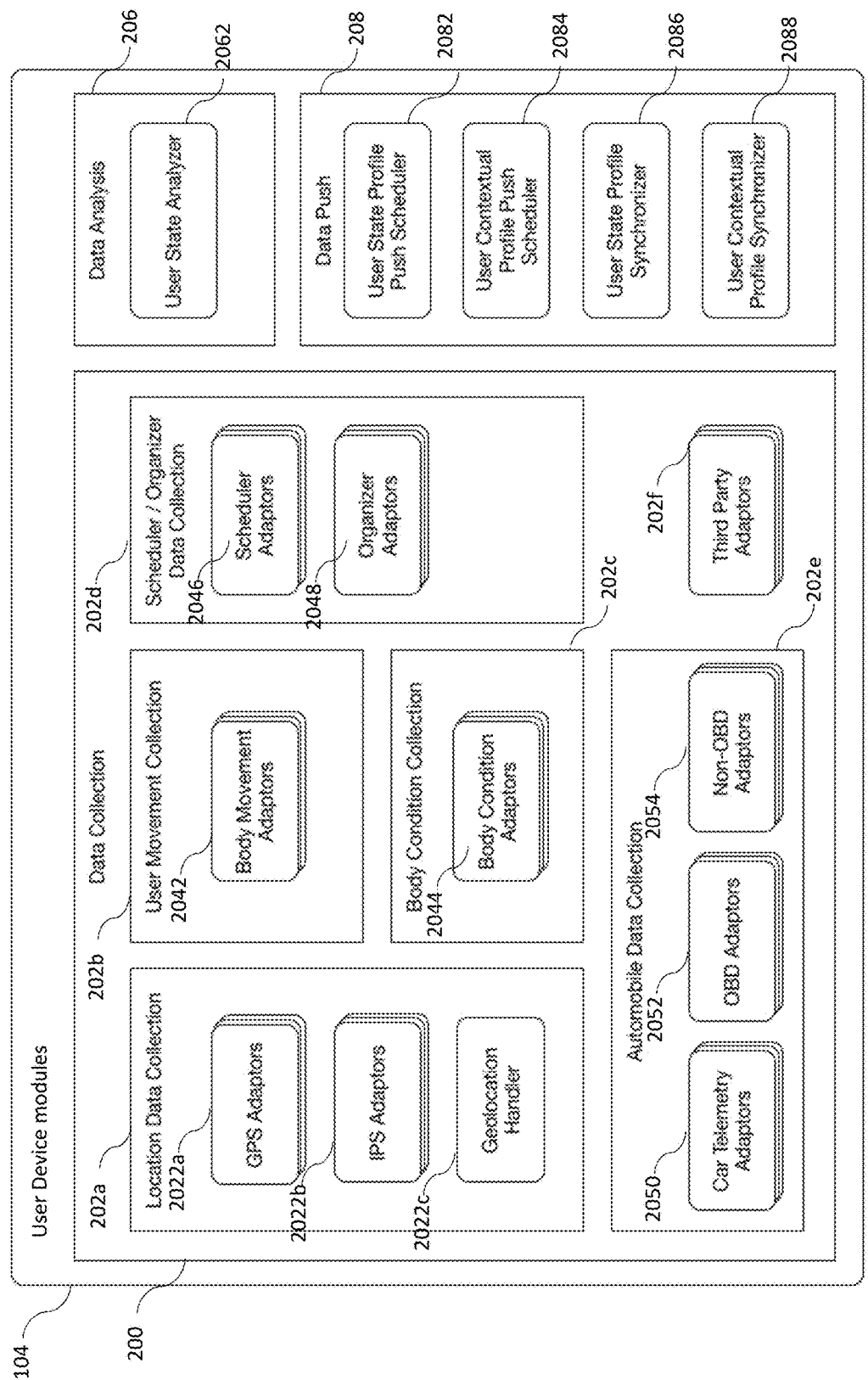
FIG. 2 is a diagram illustrating components within a user device 104, in accordance with aspects of the embodiments.

Referring now to FIG. 2, a diagram illustrating internal components or modules within a user device 104. The user device 104 may include a data collection module 200, a data analysis module 206, a data push module 208, and a memory (not shown in the Figure) operably connected to each other. The memory may include a provisioning of a plurality of databases. One of the plurality of databases may include a client user contextual profile 602 and a client user states profile. The client user contextual profile 602 stores all data being stored within it as a first user contextual data.

The memory may either be a primary memory or a secondary memory. For example, but not restricted to, random access memory (RAM), cache memory, hard disk drive (HDD), solid state drive (SSD), compact disk (CD), portable memories, and like.

Data collection module 200, may further include various types of data collection modules. Various data collection modules may include location data collection block 202a, user movement collection block 202b, body condition collection block 202c, scheduler/organizer data collection block 202d, automobile data collection block 202e, and third-party adaptors block 202f. Data collected from the data collection block 200 within the client user contextual profile 602.

Location data block 202a includes a plurality of adaptors namely Global Positioning System (GPS) adaptors 2022a, Indoor Positioning System (IPS) adaptors 2022b, and Geo-Location adaptors 2022c. The GPS adaptor 2022a gathers location data from a GPS data collector out of the plurality of data collectors 102 (as described in FIG. 1) transmitter. The location data may be gathered at regular time intervals, to have current data available for analysis. The time intervals may be user defined, server defined, or a condition triggered. User defined time intervals may be set by the user itself. The user may set the time intervals through some input interface on the user device 104. The server 110, may also define the time intervals. The time intervals may be fixed time intervals, or may be configured by the server 110 on the go, that is based on the variation in user related data being collected at fixed time intervals otherwise defined as condition triggered. Hence for condition triggered, if the variation in the user related data is frequent, the server 110 may decrease the time interval itself or in a scenario wherein, the user related data is similar at subsequent fixed time intervals the server 110, may increase the time interval automatically. Therefore, it may be a self-learning process. Data collected by the location data collection block 2022a may be stored within the client user contextual profile 602. Furthermore, the IPS adaptors 2022b helps in gathering the indoor positioning data about the user, in case, the user is in an enclosed area like a mall, a building, home, office, etc. IPS adaptors 2022b gathers information from IPS data collectors out of the plurality of data collectors 102 (as described in FIG. 1) transmitter. As also described earlier, the IPS data may be collected regularly at regular intervals of time wherein the intervals of time may be user defined, server defined, or a condition triggered (details of which have been described above). The user movement collection block 202b, may further include a body movement adaptor(s) 2042. The body movement adaptor(s) 2042 gathers data from wearable devices. Wearable devices may include smart watches, or smart bands etc. The wearable devices may include data collectors like gyroscope, accelerometer etc. The body movement adaptor(s) 2042 retrieves orientation information from the gyroscope and acceleration information from the accelerometer. Thereafter, the body movement adaptor(s) analyzes the collected orientation and acceleration data to calculate body movement of the user and stores normalized result of the analyzed user movement data to the client user contextual profile 602. The time intervals may be user defined, server defined, or a condition triggered.

The body condition collection block 202c, may further include body condition adaptor(s) 2044. The body condition adaptor(s) 2044 may gather data from body condition sensors like heartbeat sensors, blood pressure sensors, or blood glucose sensors. The raw data collected from the sensors (mentioned above) is normalized and stored within the client user contextual profile 602. The raw data as reported by the sensors may be a single key-value pair or a summary generated from a health reporting software installed on the user device 104. The time intervals may be user defined, server defined, or a condition triggered. Data collection block 200, further includes a scheduler/organizer data collection block 202d. The scheduler/organizer block 202d may further include scheduler adaptor(s) 2046 and organizer adaptor(s) 2048. The scheduler adaptor(s) 2046 collects data about user's calendar items from calendar software in the user device 104. The scheduler adaptor(s) 2046 may be a plug-in software or included within the operating software layer of the user device 104. The calendar data collected is organized and normalized and stored within the client user contextual profile 602.

The automobile data collection block 202e may include in-car console data adaptors like cat telemetry adaptor(s) 2050, On-Board Diagnostic (OBD) adaptor(s) 2052 and Non-OBD adaptors 2054. The car telemetry adaptor(s) 2052, gathers information received from a car telemetry system. The data may be collected regularly or at fixed intervals of time and stored, each time data is collected, to the client user contextual profile 602. The OBD adaptor(s) 2054, may collect data from car's On-Board diagnostic system regularly. The data is stored in a normalized format within the client user contextual profile 602 each time it is being collected. Further, the Non-OBD adaptor(s) 2054, may receive data from car's other sensors that are not integrated yet with the car's OBD system. The data may be collected regularly, normalized and stored within the client user contextual profile 602. Data collected from automobile data collection block 202e may include speed of the user, whether the car is stalled or not, fuel level of the car, etc. The third-party adaptors block 202f may include other kinds of data adaptors that may gather some other user related contextual data or any third-party source and stores such data within the client user contextual profile 602.

Data analysis module 206 may be operably connected to the memory to fetch collected user-related data stored within the user contextual profile 602 at regular intervals. It further includes a user state analyzer block 2062. The user state analyzer block 2062 performs analysis on user related data collected by the data collection block 200. In an implementation, the user state analyzer block 2062 may be a processor functioning to read and analyze data and generate processed result. The user state analyzer block 2062 generates user states and stores the same within the client user states profile 606 as a first user states data, of the memory (not shown in the figure). The user state analyzer block 2062 keeps user states up-to-date. It regularly fetches new data that is being stored within the client user contextual profile 606.

Data push module 208, may further include a user state profile scheduler block 2082, a user contextual profile push scheduler block 2084, a user states profile synchronizer block 2086, and a user contextual profile synchronizer 2088.

The data collection module 200 collects the first user contextual data that may include information like location, body movement, body condition, automobile status, scheduler/organizer information and stores the first user contextual data in a normalized form, after processing it, within the client user contextual profile 602. The first user contextual data may be collected at regular intervals of time which may be user defined, server defined or condition triggered as has been described above in the description. The data analysis block 206, fetches the first user contextual data, regularly, and analyzes the user related data to generate a user states data that may be stored within the client user states profile 606, a database within the memory (not shown in the figure). The data analysis may be regularly performed to update the user states regularly based on the updated first contextual data. The data push module 208, prepares a push schedule of the first user contextual profile and the user states data. The user state profile scheduler 2082 schedules pushing or the first user states data to the server 110 from the user device 104. In a similar manner, the user contextual profile push scheduler block 2084 is responsible for determining push schedule of the first user contextual data to the server 110 form the user device 104. The user states profile synchronizer block 2086, and the user contextual profile synchronizer 2088 are components that perform pushing of the user states data and the first user contextual data from the user device 104 to the server 110.

Figure 3:
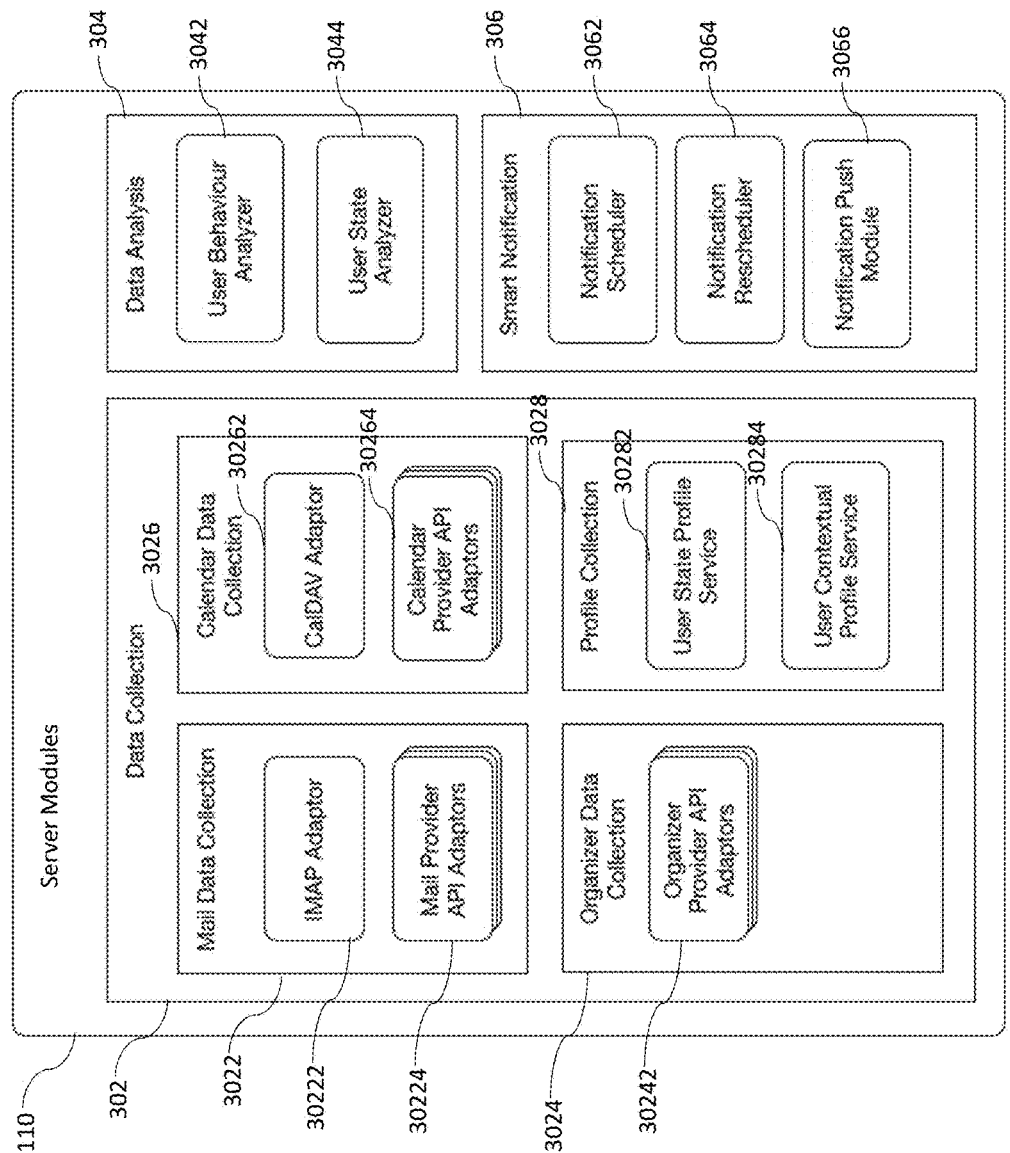
FIG. 3 is a diagram illustrating components within a server, in accordance with aspects of the embodiments.

Now referring to FIG. 3, a diagram illustrating internal components or modules within the server 110, in accordance with aspects of the embodiments. The server 110 may include a data collection block 302, a data analysis block 304 and a smart notification module 306 and a memory (not shown in the Figure) operably connected to each other. The memory may include a provisioning of plurality of databases. The plurality of databases may include a server user contextual profile 630, a server user states profile 616, a notification source 684, a user device 104 profile 682, a user behavior profile 666 and, a notification push schedule 688.

Data collection module 688 may include a mail data collection block 3022, an organizer data collection block 3024, a calendar data collection block 3026, and a profile collection block 3028. Data collection module 688 collects a second user contextual data which may be the data being collected by the server 110 using a plurality of adaptors (not shown in Figure). The second user contextual data may be then stored within the server user contextual profile 630.

The mail data collection block 3022 includes a plurality of server side adaptors that may be an IMAP adaptor 30222, and a mail provider API adaptor 30224. These adaptors collect information from mail profile of the user. Information may include information data like meeting venue, upcoming conferences, upcoming projects, new projects, etc. The IMAP adaptor 30222 retrieves mail data via Inter Message Access Protocol (IMAP). This is a protocol that stores email messages on a server and allows end user to manipulate and view the email messages. The Mail Provider API adaptors 30224 retrieves mail data by leveraging specific mail provides application program interfaces (APIs). The data collected from the both the adaptors is normalized and stored within the server user contextual profile 630. Further, the organizer data collection block 3024 may include organizer provider API adaptors 30242 that retrieve organizer data by leveraging specific organizer provider APIs. Data collected by the organizer provider API adaptors 30242 may include information like appointments, free time, important meeting schedules etc. the calendar data collection block 30262 includes a plurality of calendar adaptors. The calendar adaptors may include a CalDAV adaptor 30262 that retrieves calendar data via a CalDAV protocol. CalDAV, is an Internet standard allowing a client to access scheduling information on a remote server. It extends WebDAV (HTTP-based protocol for data manipulation) specification and uses iCalendar format for the information. Furthermore, the calendar adaptors may include a calendar provider API adaptor(s) 30264. The calendar provider API adaptor(s) 30264 retrieves calendar data by leveraging specific calendar provider APIs. The calendar data may include specific information about the user like trip dates, meeting timings, project delivery dates etc. Data collected by the mail data collection block 3022, the organizer data collection block 3024, and the calendar data collection block 3026 may be stored within the server user contextual profile 630. This second user contextual data may be analyzed (to be described later) to generate a second user states data stored within the server user states profile 616.

The profile collection block 3028 includes a user states profile service adaptor 30282 and a user contextual profile service adaptor 30284. Both these adaptors, receive the first user states data and the first user states data from the user device 104. The first user states data may be stored and merged with the second user states data stored within the server user states profile 616. Similarly, the first user contextual data may be stored and merged with the first user contextual data stored within the server user contextual profile 630. Data collection module 302 collects data at regular intervals of time and the server user contextual profile 630 and the server user states profile is kept up-to date. The regular intervals of time can be either user defined, server defined or condition triggered as has been described above in conjunction with FIG. 2.

The data analysis module 304, operably connected to the memory, fetches the second user contextual data from the server user contextual profile to analyze and generate user behavior data by the user behavior analyzer 3042. The user behavior may be analyzed to generate a user behavior profile that may be stored within the user behavior profile database 666. It regularly gets new data from the server user contextual profile 630 and creates new user behavior profiles. The data analysis module 304, may further include a user states analyzer 3044 that may analyze the second user contextual data that may be updated when the first user contextual data is merged to it, and may generate corresponding user states profile. Whenever, there are user states overlaps with time, the user states analyzer 3044 may converge them as a new state and update the server user states profile 616. Hence, the second user states profile may be updated from time to time with adding or merging the first user states data and by analyzing the updated second user contextual data, which may be updated by merging newly acquired and pushed first user contextual data.

In an implementation, the user behavior data may include a notification reading behavior of the user. The notification reading behavior of the user may be based on anyone of a topics of messages that the user is likely to read in a specific time, location and device, senders of messages that the user is likely to read in a specific time, location and device, topics of messages that the user is likely to ignore in a specific time, location and device, senders of messages that the user is likely to ignore in a specific time, location and device, topics of messages that the user is likely to respond in a specific time, location and device, and senders of messages that the user is likely to respond in a specific time, location and device or a combination thereof.

The smart notification module 306 may include a notification scheduler block 3062. The notification scheduler 3062 prioritizes and schedules notifications to the user on the user device 104 of his choice according to the updated user behavior profile and the updated user states data stored within the user behavior profile 666, and the server user states profile 616. The notification scheduler block 3062 may determine the appropriate timing, location and the user device 104 to deliver notifications to the user. The notifications may be stored within the notification push schedule 688 as will be described later in the description.

The notification rescheduler block 3064, may fetch the notifications that are stored within the notification push schedule 688. It may then analyze, review and update the priority and schedule of the existing notifications. The notification rescheduler block 3064, based on the changes in user states, may adapt and reschedule notifications accordingly. It may also decide the delivery to a specific user device 104 which the user is more likely to notice. The preferences of the user devices by the user may be stored within the user device 104 profile 682. The preferences may be based on an analysis of the user behavior with his user devices. This helps to identify what notification may be delivered to what device and at what time. The notification push block 3066, is a component that may perform actual pushing of the notifications to the user device 104 as per the determined schedule.

The data collection module 302 may collect the second user contextual data that may include information from user's organizer, user's calendar, user's mail IDs and data from the user device 104 i.e. the first user contextual data and the first user states data. The second user contextual data may be then stored in the server user contextual profile 630 whereas the first user contextual data is also merged to the second user contextual data. Also, the second user contextual data may be then analyzed by the user behavior analyzer block to generate user behavior profiles that may be stored within the user behavior profile 666. Further, the user state analyzer 3044 may analyze the second user contextual data and generate the second user states data that may be stored within the server user states profile 616. The server user states profile 616 may also store the first user states profile received from the user device 104 and update the second user states data. The data analysis block 304 may fetch updated data at regular intervals as user contextual data may be updated at regular intervals of time that is being stored within the server user contextual profile 630 regularly. The smart notification module 306 may prepare a push schedule for notifications to be delivered to the user device 104. The notification scheduler 3062 prioritizes and schedules notifications to the user device 104 of user's choice and preference in accordance with the updated user behavior profile and the updated user states data stored within the user behavior profile 666, and the server user states profile 616. The notification rescheduler block 3064, may fetch the notifications that may be stored within the notification push schedule 688. It may analyze, review and update the priority and schedule of the existing notifications. The notification rescheduler block 3064, based on the changes in user states, may adapt and reschedule the notifications accordingly. The notifications may be then pushed to the user device 104 by the notification push block 3066 through the network 112.

Figure 4A:
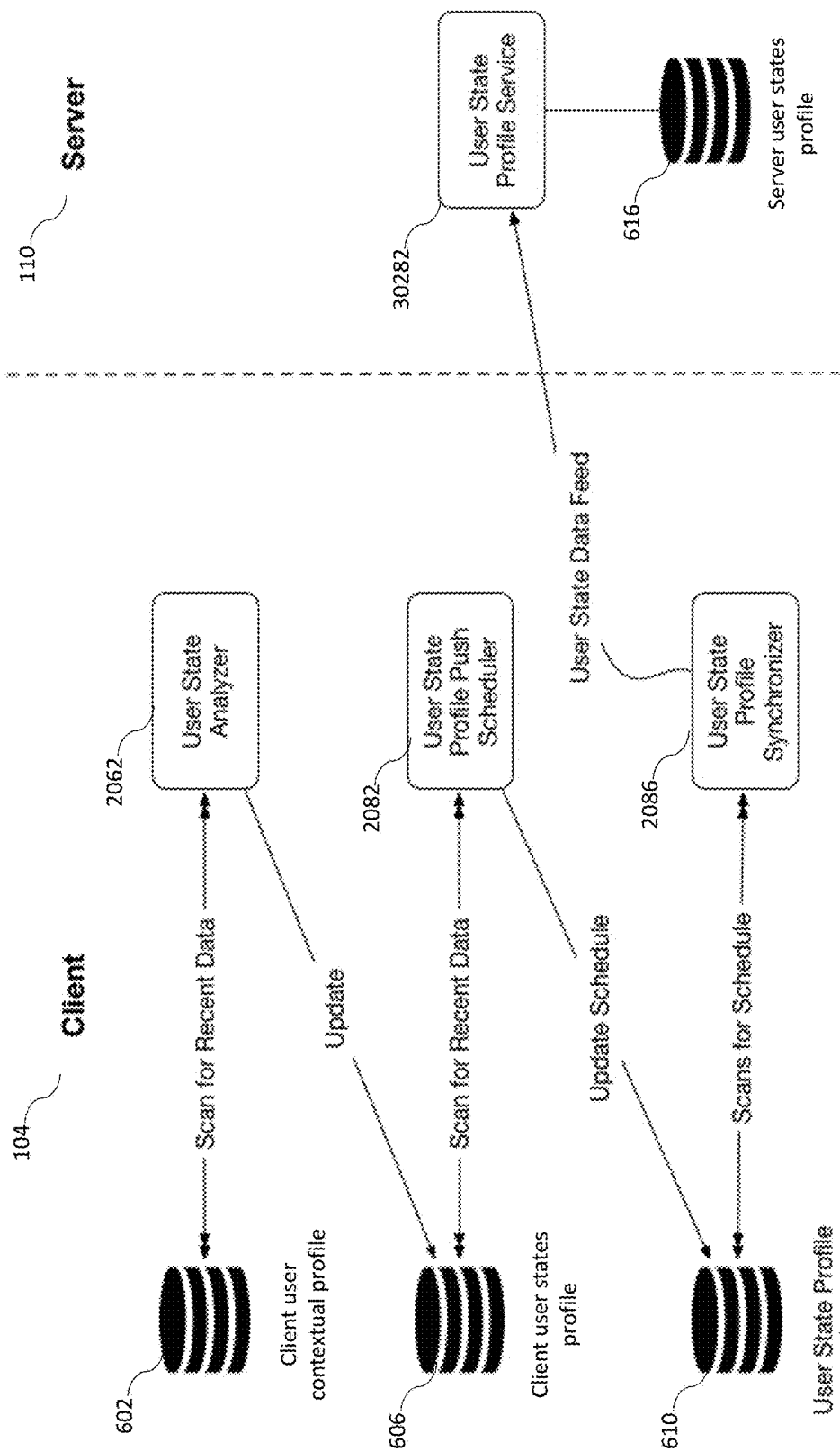
FIG. 4a is a diagram illustrating a first user states data generation in a user device, in accordance with an aspect of the embodiments.

Now referring to FIG. 4a, a diagram illustrating generation of the first user states data and transmission to the server 110. The user state analyzer 2062 within the user device 104 may scan the client user contextual profile 602 for any recent user contextual data that may be collected by the data collection module 200. The user state analyzer 2062 may work according to a schedule for scanning of new data. The schedule may be dependent on the time intervals at which new data is collected by the data collection module 200. By analyzing new first user contextual data, new user states data is generated and stored within the client user states profile 606 as the first user states data. The first user states data may be then accessed by the user state profile push scheduler 2082 and may determine push schedule of the first user states data as per its importance and urgency. The user state profile push scheduler may store it in a user states profile push schedule database 610, as user states push profile schedule, that may be one of the plurality of databases within the memory of the user device. The user states profile push schedule may be accessed by the user states profile synchronizer 2086 that may push the first user states data to the server 110.

Still referring to FIG. 4a, the first user states data may be received by the user state profile service block 30282, within the server, which may append the first user states data to the second user states data stored within the server user states profile 616.

Figure 4B:
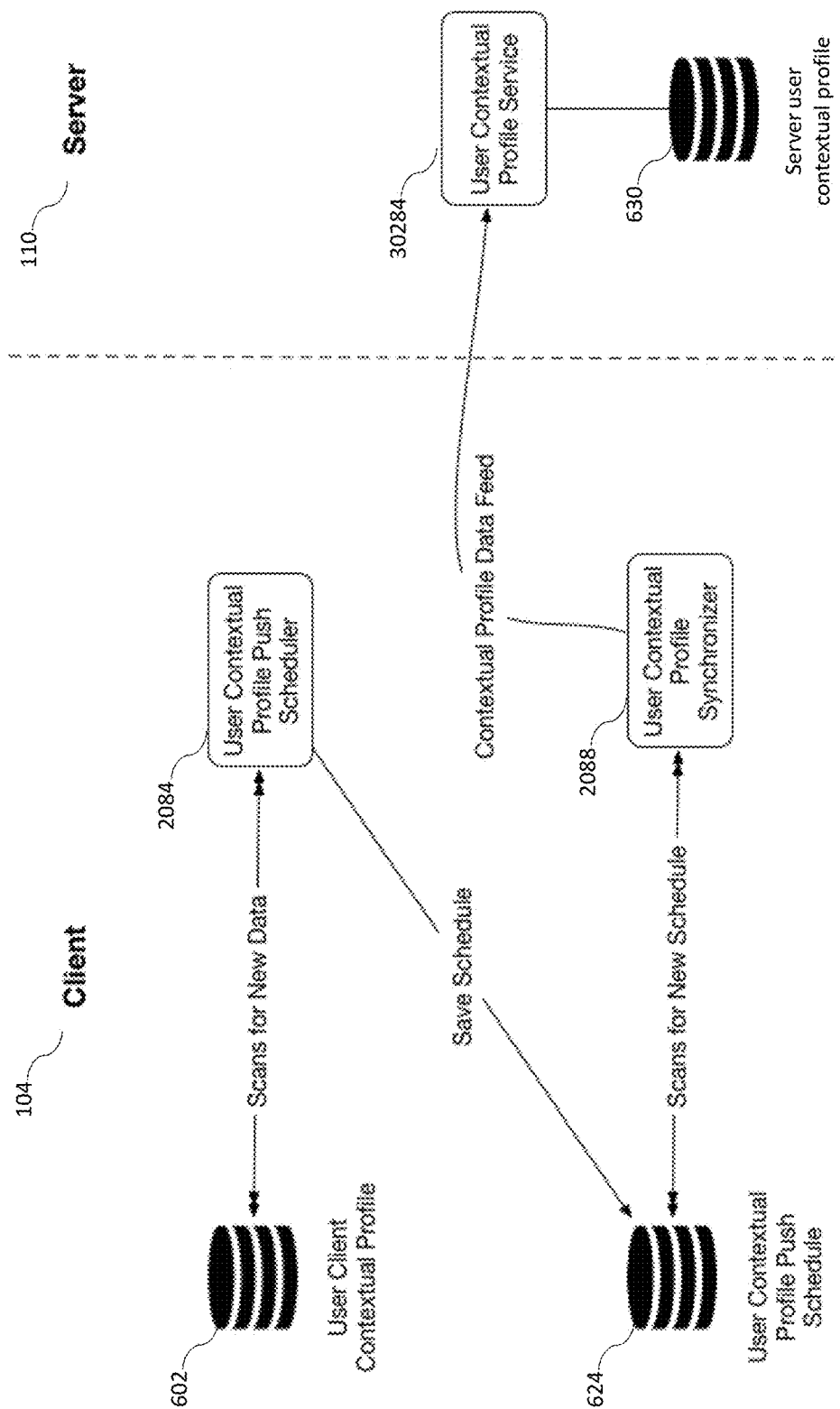
FIG. 4b is a diagram illustrating transmission of a first user contextual data by the user device, in accordance with an aspect of the embodiments.

Now referring to FIG. 4b, a diagram illustrating transmission of the first user contextual data by the user device 104, in accordance with an aspect of the embodiments. The user contextual profile push scheduler 2084, may schedule itself, as per the time intervals at which the data collection module 200 collects data, to scan the client user contextual profile 602. The time intervals may be fixed time intervals for e.g. 15 minutes. It may save a batch of the first user contextual data with a scheduled time to the user contextual profile push scheduler 624. The user contextual profile synchronizer 2088, may then scan for new schedule and sends the first user contextual data to the server 110. The user contextual profile service 30284 may receive the first user contextual service and may append and update the second user contextual data stored within the server user contextual profile 630.

Figure 5A:
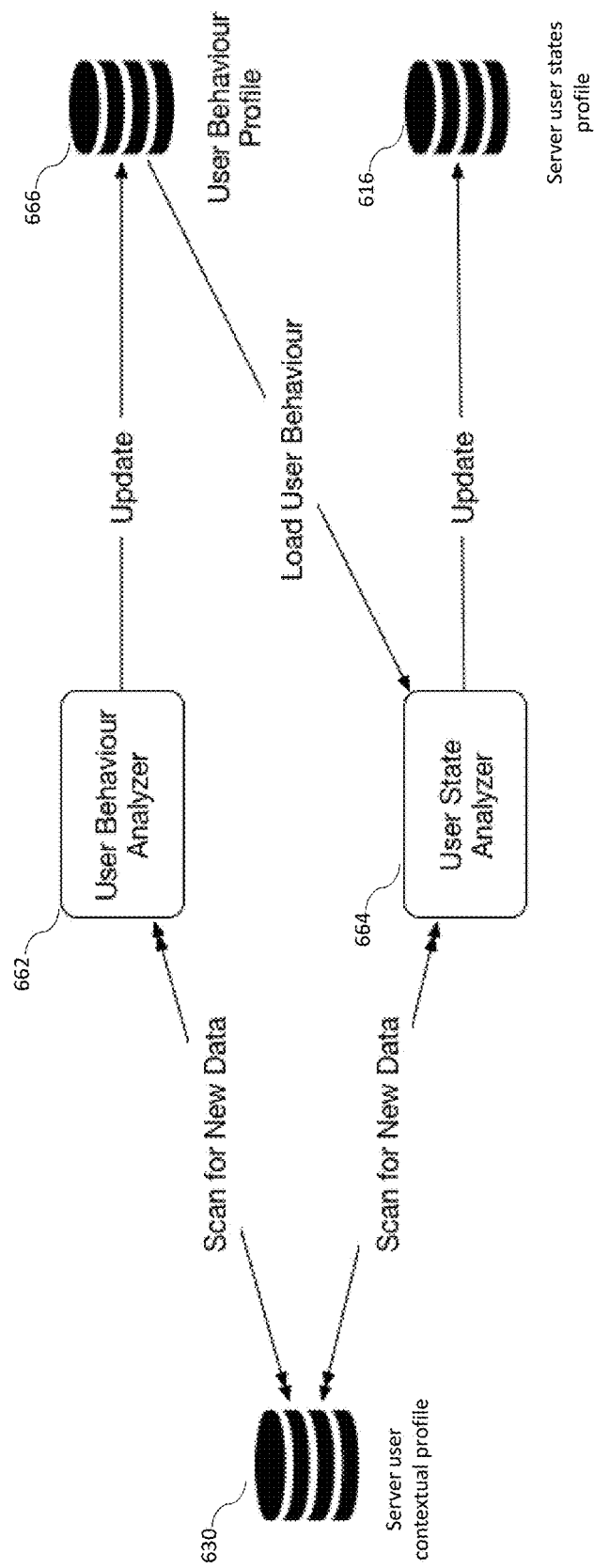
FIG. 5a is a diagram illustrating generation of second user states data and user behavior data by server, in accordance with an aspect of the embodiments.

Now referring to FIG. 5a, a diagram illustrating generation of the second user states data and the user behavior by the server 110, in accordance with an aspect of the embodiments. the second user states data and the user behavior may be utilized for delivering of notifications to the user on the user device 104 of his choice or as per his user device profile (to be discussed later). The user behavior analyzer 3042, within the server 110, may scan for new data within the server user contextual profile 630. The data may be analyzed for changes and new patterns within the second user contextual data. User contextual data may be a source of some specific action of the user and together with the observed contextual data pattern, the user behavior analyzer 3042 generates a user behavior profile. For e.g. from calendar schedule of the user, the user behavior analyzer 3042 knows that the user is attending a bowling game gathering with his/her friends. The patterns of heartbeat rate and angular movements within game period could be useful to determine a similar user activity in future. The observed patterns may be saved to the user behavior profile 666. The user state analyzer 3044 scans for new data within the server user contextual profile 630. In case there is an updated second user contextual data, the updated data may be analyzed by the user state analyzer 3044 and a new user states data may be generated which may be appended to the second user states data, stored within the server user states profile 616, and is also updated. With the observed patterns in user behavior profile, the user state analyzer 3044 may also predict user states from experience. For example, a user is very likely to be driving when his recent locations from GPS keep moving fast while his angular movement of his wearable device matches a rather static clockwise and anti-clockwise pattern. The identified user state is saved to the server user states profile 616.

Figure 5B:
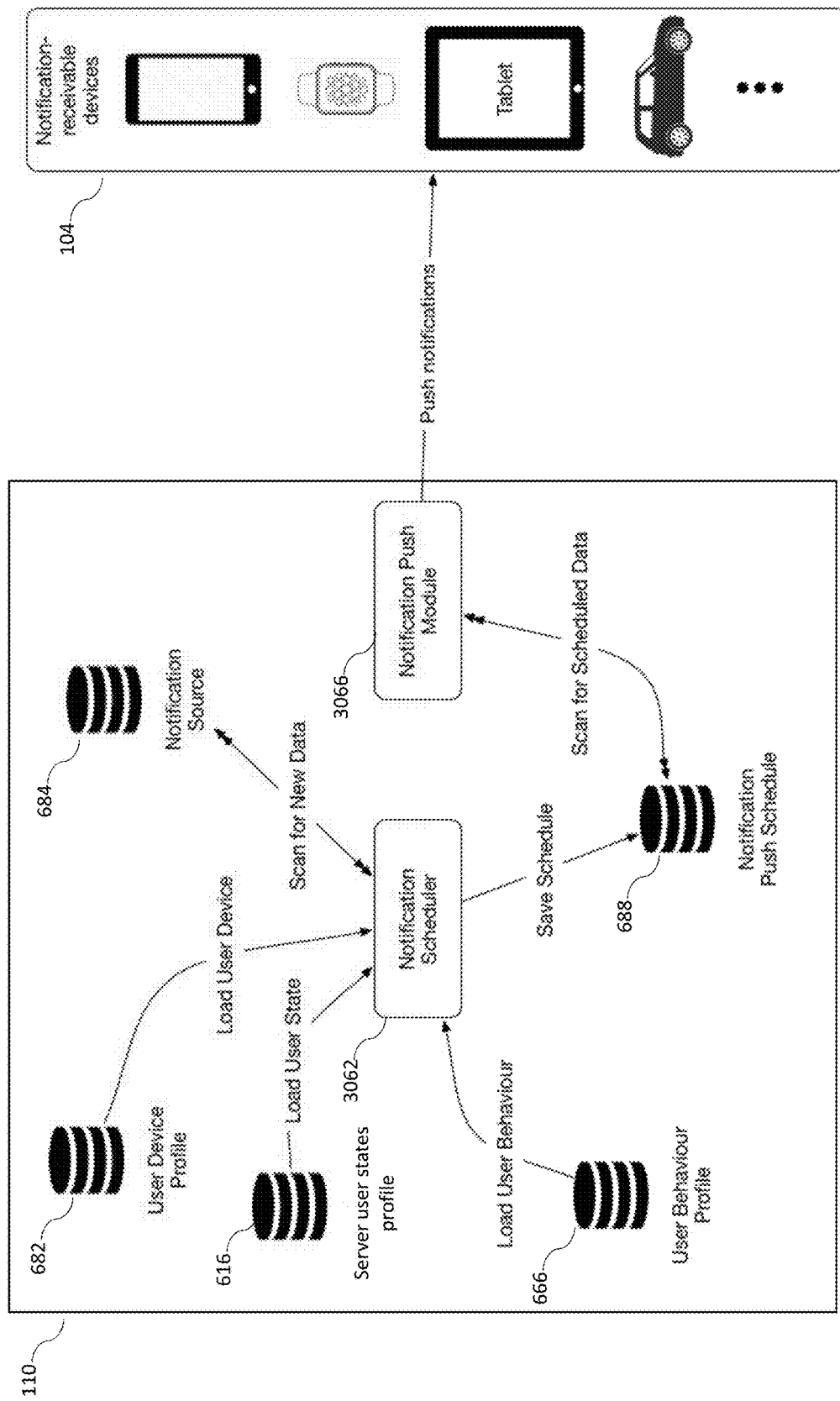
FIG. 5b is a diagram illustrating notification scheduling by the server, in accordance with an aspect of the embodiments.

Now referring to FIG. 5b, a diagram illustrating scheduling of notifications by the server 110. The notifications are scheduled by the server 110 based on the user behavior and user states data. The notification scheduler 3062 gathers notification messages from a notification source 684. The notification source may be either built within the server 110, or the user device 104 or a remote database. Based on the user behavior data stored within the user behavior profile 666 and the second user states data stored within the server user states profile 616, the priority of a notification is determined. Furthermore, the notification scheduler 3062 may also obtain the user device preference data stored within the user device profile 682 to determine the user's preference of the user device 104 that user may have for that specific time. In an example, the user at his office may have a preference of using or getting his notification on his smart phone rather than a tablet placed at his home. The notification push module 3066 accesses the notification push schedule 688 that stores the updated priority notifications and pushes the scheduled notification to the user devices 104.

As described earlier, the user behavior data is a source of user behavior patterns. The notification scheduler 3062 may initially be without any data and thereby classify unknown events to be of a medium priority. When enough user contextual data may be collected over time, the user behavior profile may be generated. This may help the server 110 to figure out which events the user reacts to most as well as how often and how quickly the user responds to those events. In an implementation, a scoring mechanism may also be utilized. An event that the user frequently responds to is given a higher score on importance, whereas an event that the user never attends to is given a lower score on importance. With enough data, the server 110 may figure out the user device 104 that the user pays most attention to.

Examples:

When it may be detected that the user is driving, "trip package advertisement" sent from travel agent may not be important and it may be given a low importance score.

When it may be detected that the user is driving at a normal speed and is near a convenient store, the reminder to "purchase soya sauce today" is given a high importance score and the notification is delivered to the user's car console.

When it may be detected that the user is at office and he is not in a meeting, an event invitation from his friend is given a medium importance score and the notification is delivered to his smartphone but not his idle tablet at home.

In some cases, a contextual data pattern may be observer and a notification may be created itself.

When it may be detected that the user is driving but the car is running out of petrol, a notification may be created to remind the user about the petrol and may tell the user about the nearest oil station for refill. This may be given a high importance score with urgency indicated.

The above-mentioned examples are simple situation examples. As the behavior profile differs from one user to another, the same event may be given a different important score for different users.

Figure 6A:
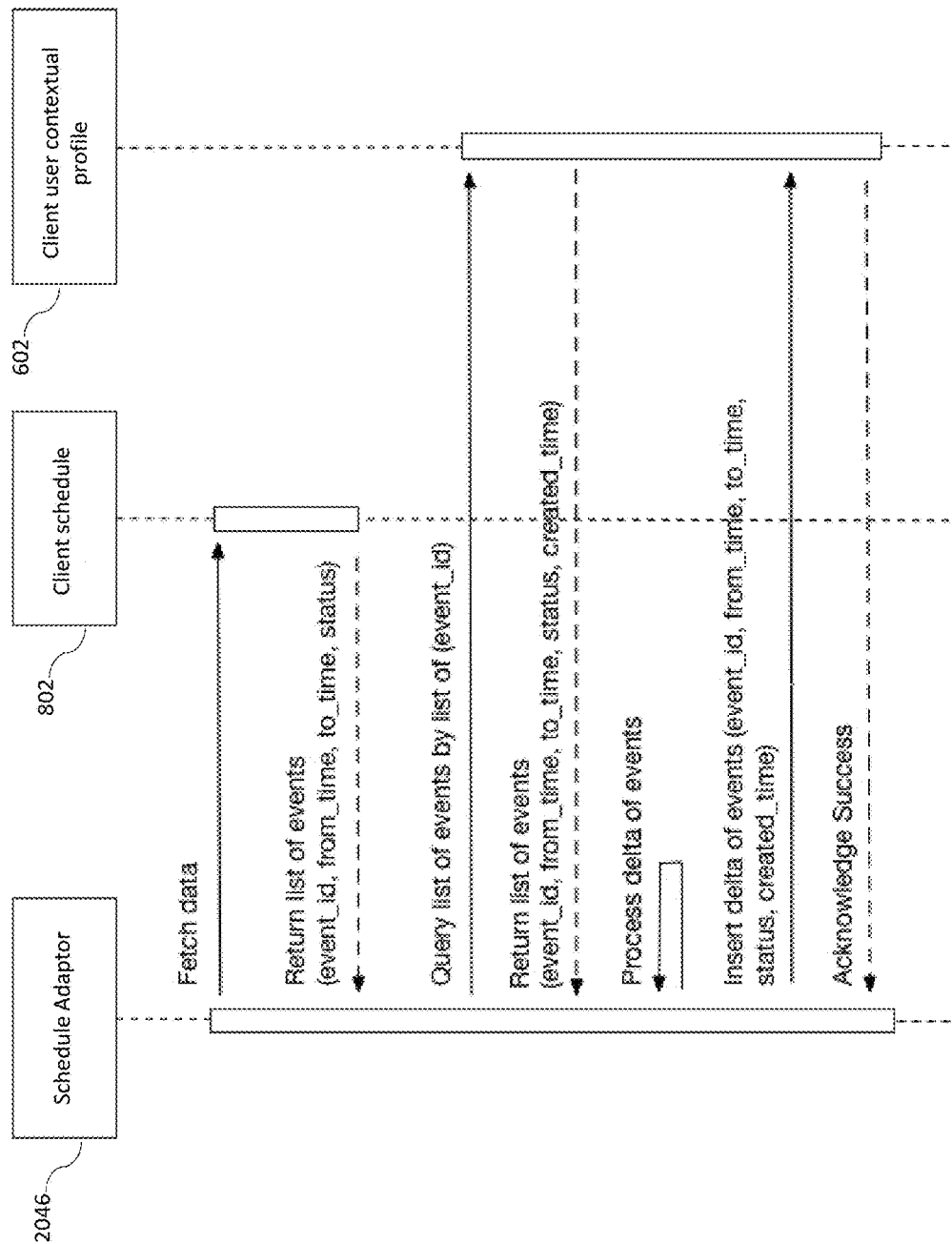
FIG. 6a is a diagram illustrating scheduler adaptor gathering calendar data from user schedule, in accordance with an aspect of the embodiments.

Now referring to FIG. 6a, a diagram illustrating how the scheduler adaptor 2046, may gather schedule data from user's schedule 802 and may generate the first user contextual data. The scheduler adaptor 2046, may be an application instance within the user device 104 that may provide user schedule 802 in the user device 104. The scheduler adaptor 2046, may be granted access by the user, to access schedule data from the user device 104. The scheduler adaptor 2046 may request data from the user's schedule 802. In return to the query of the scheduler adaptor 2046, the user's schedule 802 may return a list of events containing information like event ID, start and end time, and an indicator marked by the user himself, that whether the user has marked himself available or not available for the event. The schedule adaptor 2046, may then query the client user contextual profile 602 to perform a check any existing record for the event id fetched at previous stage. The client user contextual profile 602 may return a list of events to the scheduler adaptor 2046. The scheduler adaptor 2046 may then compute a delta of events. If an event item has no change when compared to the existing record, it is not put into the delta. The event may be put into the delta when there is a change in the event item and may be attached with a current timestamp denoted as created_time. The delta records may be then added by the scheduler adaptor 2046 into the client user contextual profile 602. An acknowledgement may be sent by the client user contextual profile 602 to the scheduler adaptor 2046, on a successful addition.

Figure 6B:
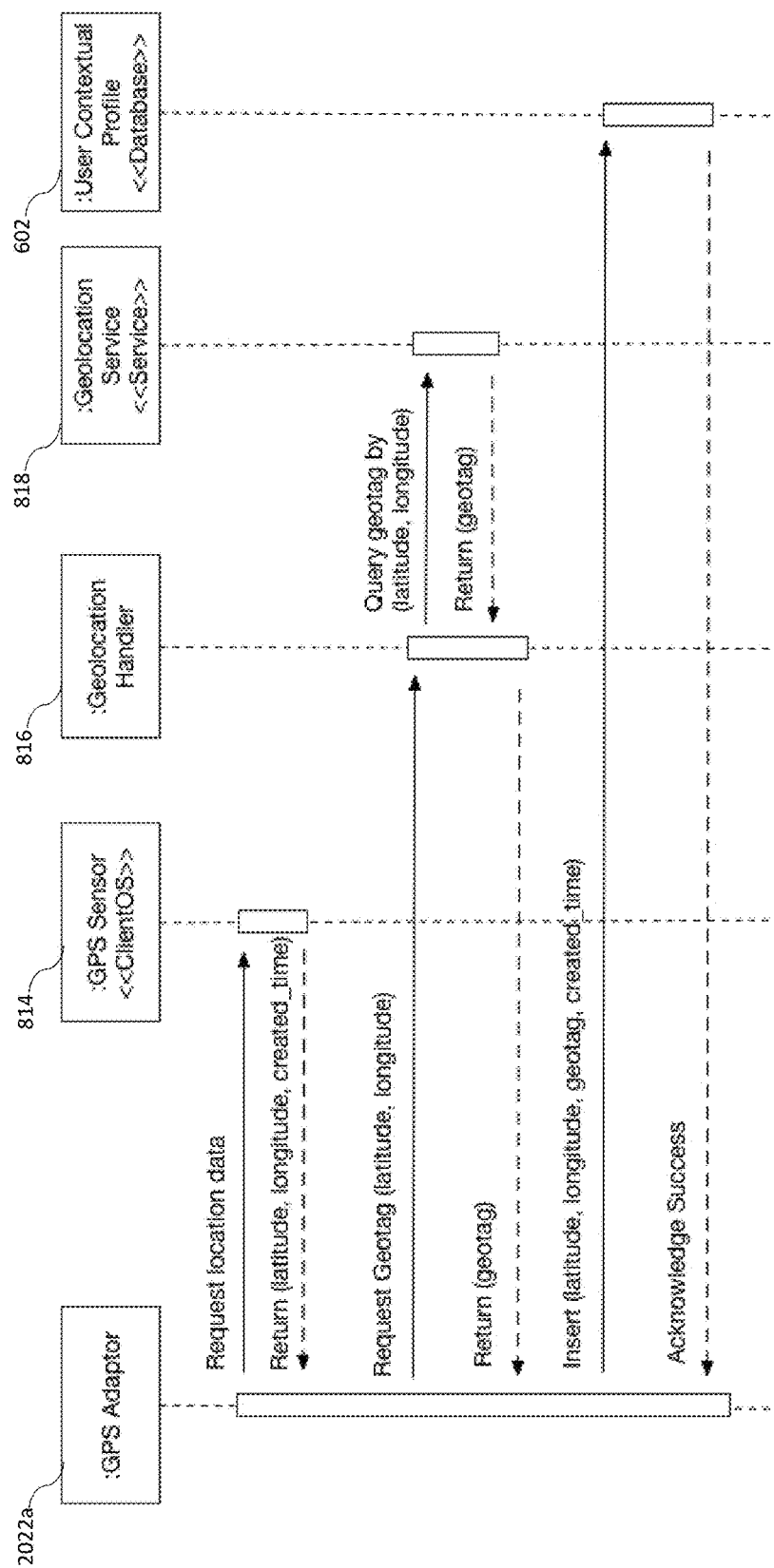
FIG. 6b is a diagram illustrating GPS Adaptor gathering location data from GPS sensor, in accordance with an aspect of the embodiments.

Now referring to FIG. 6b, a diagram illustrating the GPS adaptor 2022a gathering location data from GPS sensor, one of a plurality of data collectors 102 described in conjunction with FIG. 1 and may generate the first user contextual data. The GPS adaptor 2022a may refer to a Geolocation service that may be either an in-built service within the user device 104 or an external service that provides geolocation data. The geolocation data may include a pair of latitude and longitude. The user may grant permission to the GPS adaptor 2022a to access location data.

The GPS adaptor 2022a may request location data from a GPS sensor 102. In response to the request, the GPS sensor 102 may return a pair of latitude and longitude to the GPS adaptor 2022a. The GPS adaptor 2022a, may then request the Geolocation handler 2022c to provide geolocation metadata of the requested location data. The Geolocation handler 2022c, may further query a Geolocation service 814 to fetch the geolocation metadata. The Geolocation service 814 may provide the geolocation metadata to the Geolocation handler 2022c which may be forwarded to the GPS adaptor 2022a. The GPS adaptor 2022a, after receiving the geolocation metadata, may append the geolocation metadata and the current timestamp to the latitude and longitude pair and may insert the appended record to the client user contextual profile 602. An acknowledgement may be sent by the client user contextual profile 602 to the GPS adaptor 2022a, on a successful addition. On addition, the first contextual data may be generated or updated which may be then utilized by the user state analyzer 2062 to generate the first user states data.

In an implementation, the GPS adaptor 2022a may be a software application instance built-in to an operating system of the user device 104 or a software application downloaded to the user device 104, from an external library. In another implementation, the GPS adaptor 2022a may be a hardware module that may be built-in to a hardware of the user device 104. Hardware may be a motherboard of the user device 104.

Figure 6C:
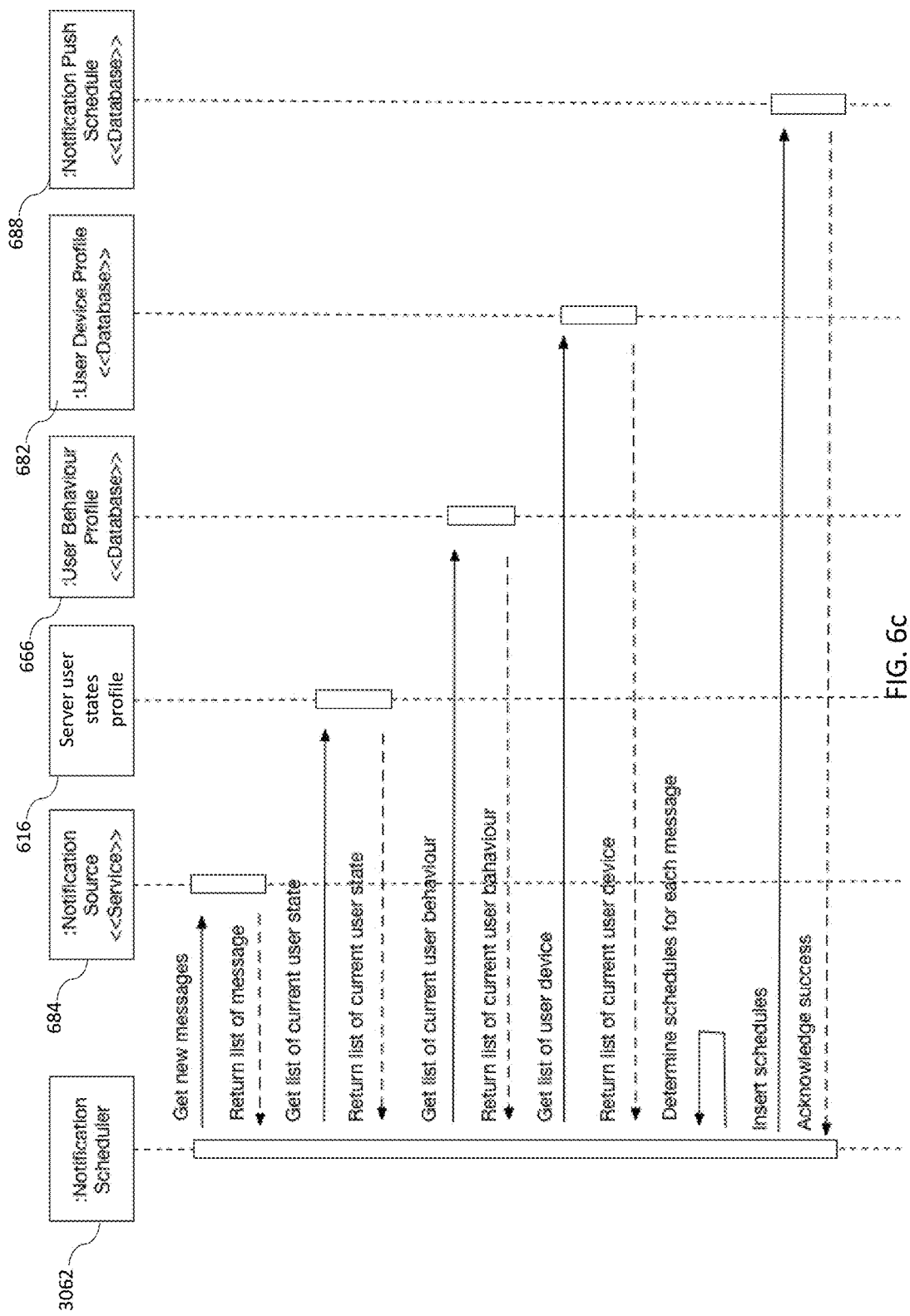
FIG. 6c is a diagram illustrating Notification Scheduler gathering different user profiles and processing scheduling, in accordance with an aspect of the embodiments.

Now referring to FIG. 6c, a diagram illustrating the notification scheduler 3062 gathering different user profiles and processing scheduling of notifications. The notification scheduler 3062 may communicate with the notification source 684 to request notification data. The notification source 684 may be an internal or external data source that contains notification messages that are scheduled to be pushed to the user device 104. The notification source 684, may then in return to the request, provide the notification scheduler 3062 with a list of notification messages. The notification scheduler 3062, after receiving the list of notification messages communicates with the server user states profile 616 to request current user state data. The server user states profile 616, may on receiving the request, respond with the current user state to the notification scheduler 3062. Subsequently, the notification scheduler may then communicate with the user behavior profile 666, to collect the current user behavior. The user behavior profile 666 may respond to the request by providing the current user behavior. After receiving the current user behavior, the notification scheduler 3062 may then communicate with the user device profile 682 to request list of user devices. The user device profile 682, may respond to the request by sending the list of user devices 104 registered. The user may register his devices while signing up for the service. After gathering the data, the notification scheduler 3062 may analyze and compute the push schedule of each notification message received, based on the user state data and the user behavior data. The push schedule may contain the exact time of delivery to the user, preferred location of receiving the notification, content of the notification message and preferred user device to be pushed to. The schedule records may then be inserted by the notification scheduler 3062 into the notification push scheduler 688. An acknowledgement may be sent by the notification push scheduler 688 to the notification scheduler 3062, on a successful addition.

Figure 6D:
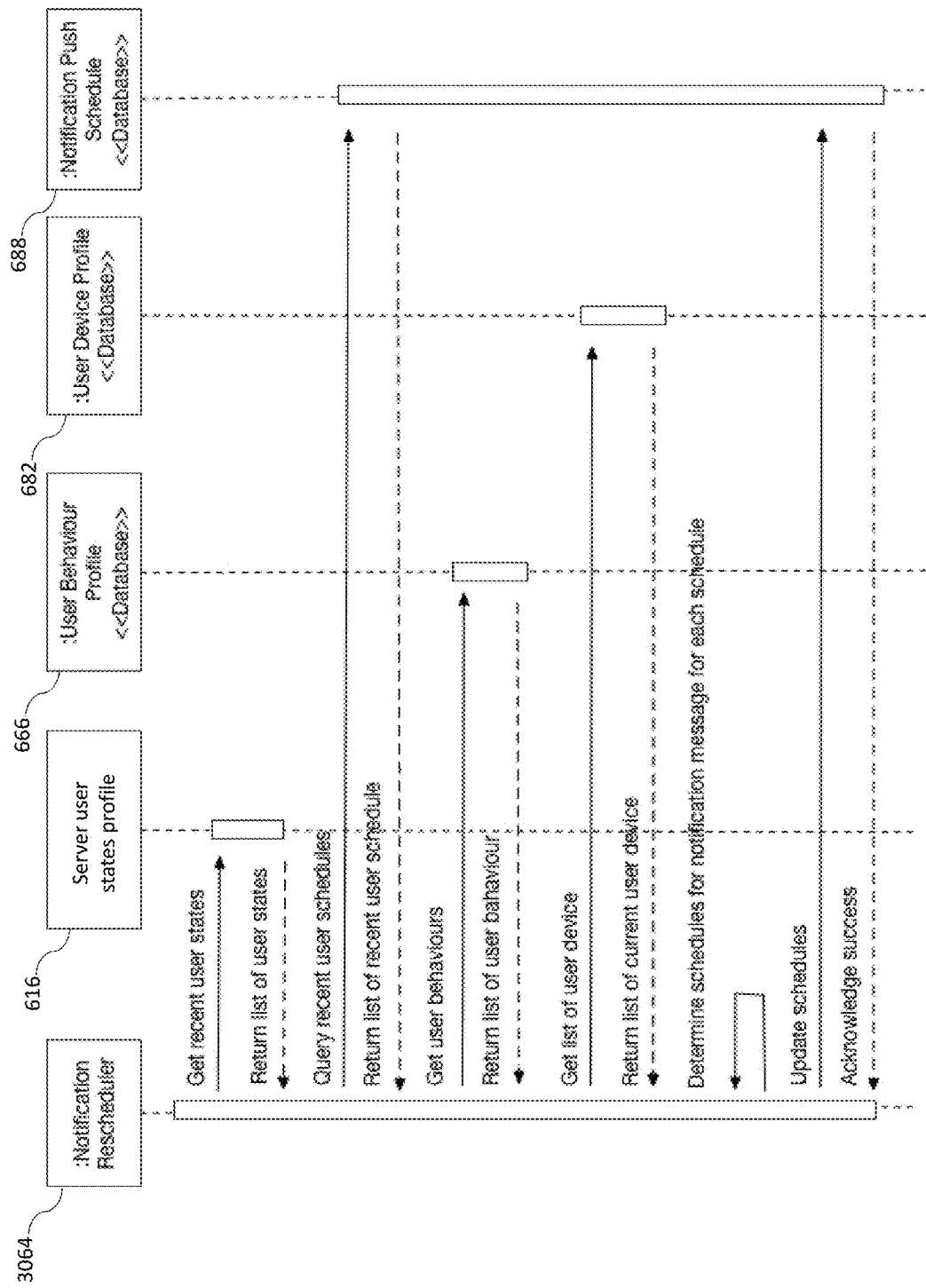
FIG. 6d is a diagram illustrating Notification Rescheduler adapting to changes in user states data and rescheduling notifications, in accordance with an aspect of the embodiments.

Now referring to FIG. 6d, a diagram illustrating the notification rescheduler 3064 adapting to the changes in user states data and rescheduling notifications delivery to the user devices 104. The notification scheduler 3064 may fetch the current user states from the server user states profile 616. The server user states profile 616, may respond to the notification rescheduler and may transmit a list of current user states. The notification rescheduler 3064, may subsequently communicate with the notification push schedule 688 to gather recent user schedules. The notification push schedule 688 may provide the list of recent user schedules after which the notification rescheduler 3064 may fetch the user behaviors from the user behavior profile 666. The notification rescheduler 3064 may then communicate with the user device profile 682 to request user device list. The user device profile 682 may provide a list of user device registered for the service. After gathering the data, the notification rescheduler may compute, for each notification message in the list, its push schedule based on the current user states data and the user behavior. The notification rescheduler 3064, may then update the scheduled records into the notification push schedule 688. An acknowledgement may then be sent by the notification push scheduler 688 to the notification rescheduler 3064, on a successful addition.

Figure 7A:
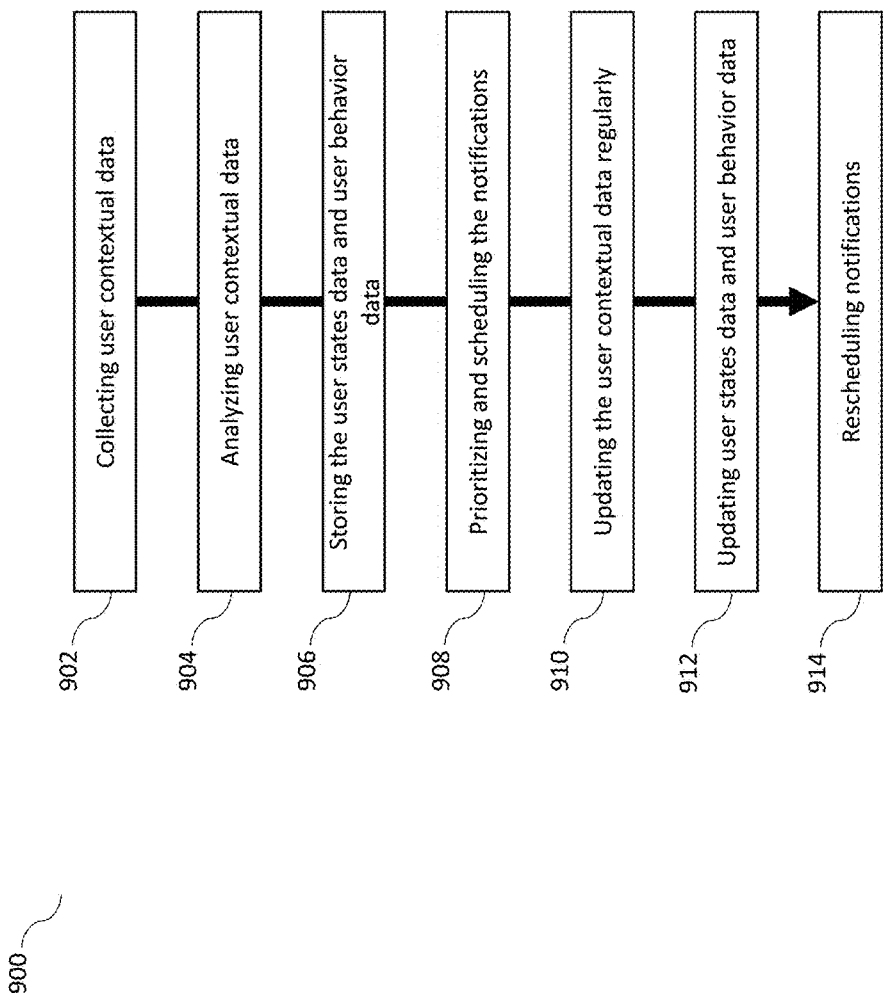
FIG. 7a is a flow chart diagram 900 depicting overall method of rescheduling of notifications to the user, in accordance with an aspect of the embodiments.

Now referring to FIG. 7a, a flow chart diagram 900 depicting a method for prioritizing and scheduling notifications to the user device 104, in accordance with an embodiment of the invention. Notification messages to be delivered to a user's device may be prioritized and scheduled based on user states and user behavior data that may be generated be from contextual data of the user collected by a plurality of data collectors 102.

At step 902, the data collection module 200 of the user device 104 collects the first user contextual data from the plurality of data collectors 102. The first user contextual data may include information like location, body movement, body condition, automobile status, scheduler/organizer information. Further, the data collection module 302 of the server 110 may also collect user related data tagged as the second user contextual data. The second user contextual data may include information from user's organizer, user's calendar, user's mail IDs and data from the user device 104 i.e. the first user contextual data.

At step 904, the first user contextual data is analyzed by the data analysis module 206 of the user device to generate the first user states data. Similarly, the second user contextual data, that may also contain the first user contextual data as the first user contextual data may be transmitted to the server 110, may also be analyzed by the data analysis module 304 of the server 110. User states data may refer to the status of the user at a specific time. It may provide information about whether the user may be free or busy. With enough contextual data provided, the user state may also tell what activity the user may be doing.

At step 906, the first user states data is stored within the client user contextual profile 602 and may also be transmitted to the server 110, where it may be appended to the second user contextual data stored within the server user contextual profile 630. Hence, the second user contextual data may be updated as well in this manner. This updated second user contextual data may be then analyzed to generate the user behavior data that may be stored within the user behavior profile 666.

At step 908, the notification scheduler 3062 prioritizes and schedules notifications to be delivered to the user device 104 based on the second user states data and the user behavior data. Further, the first user contextual data and the second user contextual data may be updated at regular intervals of time at step 910. Based on that updated data, the first user states data and the second user states data may also be updated regularly. Based on the update of the second user states data, the user behavior data may also be updated at step 912. Further, at step 914 the notification rescheduler 3064 may reschedule the notifications based on changes in user behavior and user states data.

Figure 7B:
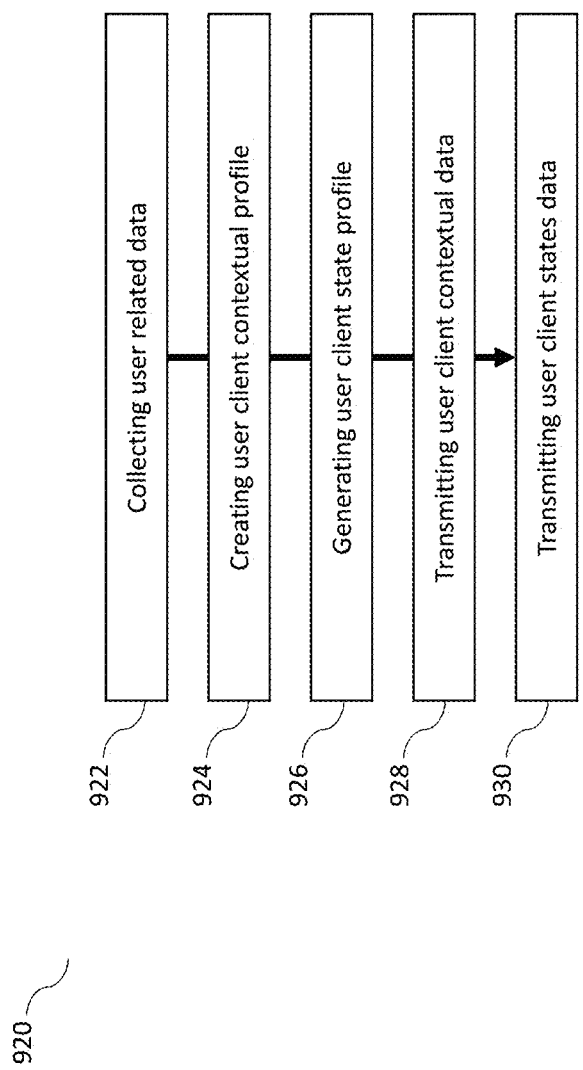
FIG. 7b is a flow chart diagram 920 depicting processing of a first user contextual data in the user device 104, in accordance with an aspect of the embodiments.

Now referring to FIG. 7b is a flow chart diagram 920 depicting processing of the first user contextual data within the user device 104, in accordance with an aspect of the invention. The first user contextual data after processing may be transmitted to the server where it may be appended to the second user contextual data that may be utilized to generate user behavior profile and user states data. Prioritizing and scheduling of notifications may be based on the user behavior data and the user states data.

At step 922, the data collection module 200 of the user device 104 collects data from the plurality of data collectors 102, as described earlier in detail in conjunction with FIG. 1. The collected data may be tagged as the first user contextual data and at step 924, the client user contextual profile 602 may be generated. The client user contextual profile 602 is a database within the user device 104 that stores the first user contextual data.

Further, at step 926, the first user contextual data is accessed by the data analysis module 206 of the user device 104 and analyzed to generate the first user states data, that may be utilized to generate the client user states profile 606.

Due to limited storage for the user device 104, only recent records are kept and old records are deleted once they are sent to the server 110. At step 928, the user states data may be accessed by the user state profile synchronizer 2086 and may be transmitted as per the schedule determined by the user state profile push scheduler 2082. Similarly, at step 930, the first user contextual data is accessed by the user contextual profile synchronizer 2088 and transmitted to the server as per the schedule determined by the user contextual profile push scheduler 2084.

Figure 7C:
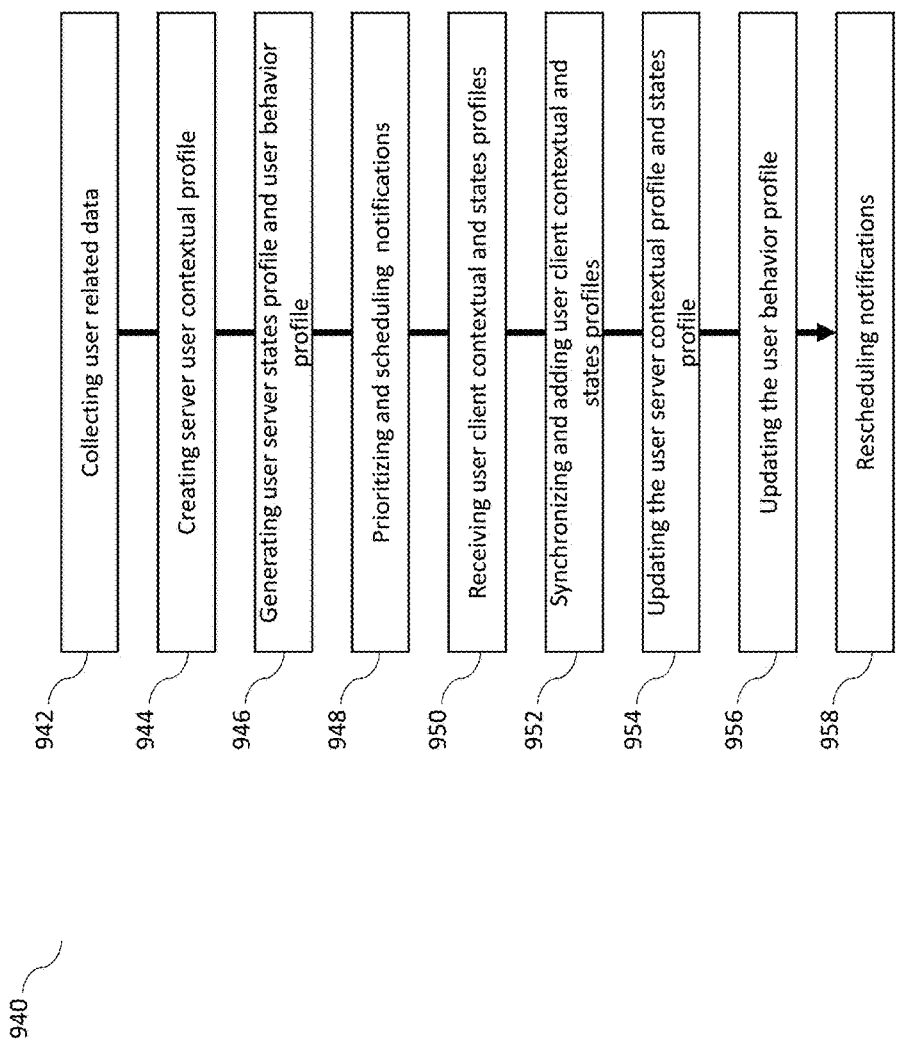
FIG. 7c is a flow chart diagram 940 depicting server side processing and rescheduling of notifications to the user, in accordance with an aspect of the embodiments.

The first user contextual data and the first user states data received by the server is further processed detail of which will be provided with description of FIG. 7c.

Now referring to FIG. 7c, a flow chart diagram 940, depicting prioritizing and scheduling of notifications within the server 110. Notification messages to be delivered to a user's device may be prioritized and scheduled based on user states and user behavior data that may be generated by from contextual data of the user collected by a plurality of data collectors 102.

At step 942, the data collection module 302 of the server 110, collects user related data tagged as the second user contextual data. The second user contextual data may include information collected from user's organizer, user's calendar, user's mail IDs, etc. At step 944, the server user contextual profile 630 may be generated wherein the second user contextual data may be stored. The server user contextual profile 630, may be a database stored within the server 110, or a database remotely placed connected to the server via a wired or wireless network connection. At step 946, the second user states data is generated. The second user states data may be generated by analyzing the second user contextual data by the data analysis module 304. User states data may refer to status of a user at a specific time. It may also tell whether the user is free or busy. Similarly, the data analysis module 304, further generates the user behavior data by analyzing the second contextual data.

At step 948, the notification scheduler 3062 prioritizes and schedules the notification messages accessed from the notification source 684. The priority and schedule may be based on the second user states data and the user behavior data. At step 950, the data collection module 302 receives the first user contextual data and the first user states data. The first user contextual data and the first user states data are appended to the second user contextual data and the second user states data and the data may be updated at step 952. At step 954, the server user contextual profile is updated based on which the second user states data may be updated. At step 956, the user behavior data is also updated that further updated the user behavior profile. At step 958, the notification rescheduler 3064, reschedules the notifications based on the changes in the user states data and the user behavior data.

Figure 7D:
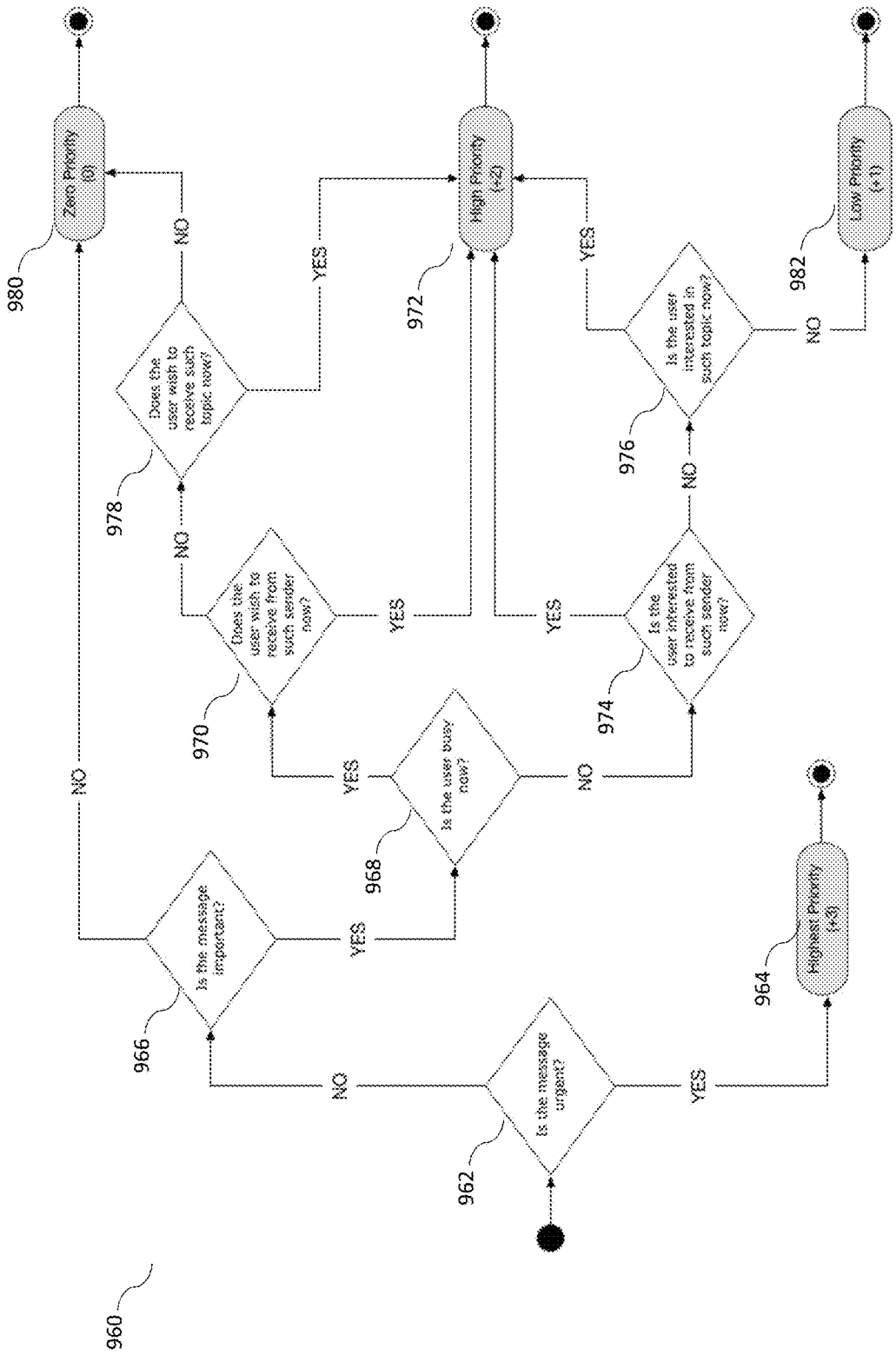
FIG. 7d is a flow chart diagram 960 depicting decision making with respect to prioritizing notifications in a notification scheduler, in accordance with an aspect of the embodiments.

Now referring to FIG. 7d, a flow chart diagram 960 depicting decision making with respect to prioritizing notifications based on priority score by the notification scheduler 3062, in accordance with an aspect of the invention. For the ease of illustration, the priority value shown in the Figure is a discreet value. The notification scheduler 3062 may utilize any other number value. The description further will include importance scores as described in examples set forth in description of FIG. 5b.

At step 962, the notification scheduler 3062 checks whether the message is urgent or not. In case the message is urgent, it is given highest priority and notification is delivered, at step 964, to the user on his user device 104. If the message, is not urgent, then at step 966, the notification scheduler 3062 checks whether the message is an important message. If the message is not determined to be important, then notification priority of the message is lowest at step 980. If the message is important, then at step 968, the notification scheduler 3062 determines, whether the user is busy or not. In case the user is busy, then at step 970, the message is examined based on user's behavior data. Based on the user behavior data, at step 978, the notification scheduler 3062 may determine that whether the user wishes to receive notifications from sender of the message. If user wishes to receive message from the sender then the message is given high priority at step 972. But in case, the user does not wish to receive messages from the sender, then the message is given lowest priority at step 980.

In case at step 968, the user is determined to be free, then at step 974, the notification scheduler 3062 checks user behavior profile to find out whether the user wishes to receive message from the sender. If yes, then the message is given high priority at step 972. However, in case the user wishes not to receive messages from such sender, then at step 976, the message undergoes interest checking. Whether the user wishes to receive messages with such topic or not. In case yes, then the message is given high priority at step 972. But in case the user does not wish to receive messages of such topic, then the message is given a low priority at step 982.

Messages with highest priority are scheduled to be delivered immediately. Second in the queue of notification delivery are messages with high priority. Messages with low and lowest priority are delivered in descending order of priority and may be delivered to the user when he is not busy, like in home, before going to sleep, etc.

Examples

Heartbeat rate measuring body condition may be considered more important than an invitation from a friend. Generally, body condition parameters may be given a higher score of importance than calendar invitation by default. For example, a set of heartbeat rates within a time window of 2 minutes. User State Profile Push Scheduler 2082 takes the set of heartbeat rates and detects a sudden rise in value. It treats such a user state profile as high importance.

Besides the nature of the context data, time matters may also be used to measure the urgency of user context. For example, user's boss may invite the user to join a meeting that is held 30 minutes from current time and the new event may or may not affect the user's existing schedule. Such a recent data is considered as of medium importance.

Context data is treated as low importance as it does not introduce instant effect on the user. For example, an event that is to be held 1 month later may be considered of very low importance.

The above examples are some of simplest user cases. A combination of all parameters may be used to determine the importance of the user state data.

Figure 7E:
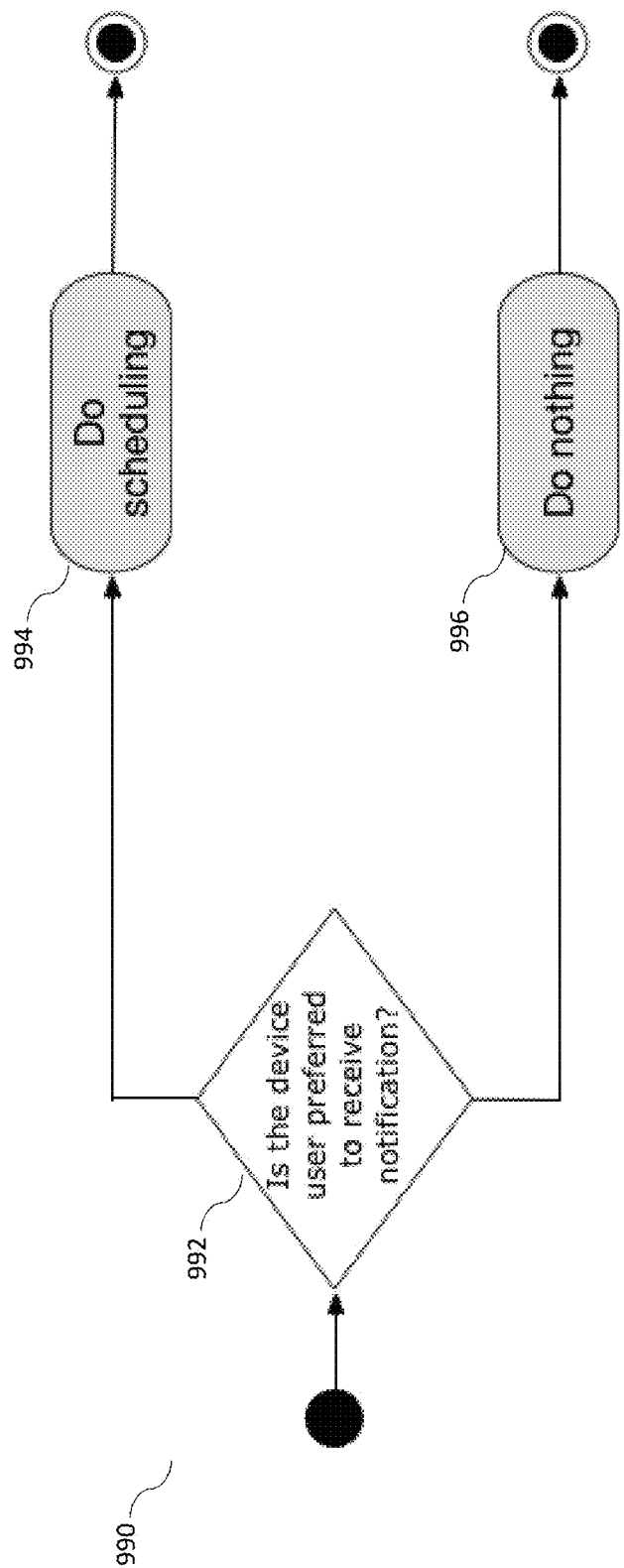
FIG. 7e is a flow chart diagram 990 depicting decision making with respect to device to deliver notifications in a notification scheduler, in accordance with an aspect of the embodiments.

Now referring to FIG. 7e, a flow chart diagram 990 depicting decision making, with respect to the delivery of notifications to the user device 104. As described above, delivery schedule of the notifications based on their priority score may be determined. Further, the notification scheduler 3062, determines the user device 104 to which the notifications are to be delivered. This decision may be based on the user behavior data. the user behavior data may provide information about which user device 104, the user prefers to receive the notifications at that time, location, etc. At step 992, the notification scheduler 3062 determines whether device to which notification is to be delivered is user preferred or not. If the user device 104 is a preferred device, then the notification is scheduled to be delivered to the device at step 994. However, if the device is not preferred, then at step 996, no scheduling is performed.

The user may react to different notifications in different manner. The user reaction data may be collected as contextual data and added to the user's behavior data. The data analysis module 304 may then analyze it and may obtain usage pattern of the user device 104. It may then be predicted to be user's preferred device for that specific time and location to deliver the notifications.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for prioritizing and scheduling notifications comprising:
   a plurality of user devices corresponding to a user, wherein each of the plurality of user devices comprises:
      a plurality of user device adaptors configured to regularly collect a first user contextual data corresponding to the user;
      a user device analysis engine configured to analyze the first user contextual data and generate a first user states data;

a memory configured with a plurality of databases to store the first user contextual data and the first user states data separately; and a data push module configured to transmit the first user contextual data and the first user states data;

a server, connected to the plurality of user devices through a network, comprising:

a plurality of server adaptors configured to regularly collect a second user contextual data corresponding to the user;

a server analysis engine configured to analyze the second user contextual data and generate a second user states data and a user behavior data;

a server memory configured with a plurality of databases to store second user contextual data, the second user states data and the user behavior data separately;

a synchronizer module configured to receive, add the first user contextual data and the first user states data to the second user contextual data and the second user states data and update the second user contextual data and the second user states data and corresponding user behavior data;

a notification module to determine priority and scheduling of notifications, wherein the determination of priority and scheduling is based on the update user behavior data and the user states data.

2. The system of claim 1, wherein the plurality of user devices is chosen from a group comprising a smartphone, a smart watch, a tablet computer, and an On-Board Diagnostic (OBD) module.

3. The system of claim 1, wherein the plurality of user device adaptors is anyone of a Global Positioning System (GPS) adaptor, a Location Based Service (LBS) adaptor, an Indoor Positioning System (IPS) adaptor, a Geolocation handler adaptor, a User Movement adaptor, a calendar adaptor, an organizer adaptor, a body condition adaptor, a Car Telemetry adaptor, an On-Board diagnostics (OBD) system adaptor or a Non OBD adaptor.

4. The system of claim 1, wherein the user device analysis engine is a user state analyzer.

5. The system of claim 1, wherein the plurality of databases includes a user contextual profile database and a user state profile database.

6. The system of claim 1, wherein the data push module further includes a user contextual profile push scheduler configured to schedule new user contextual data to be transmitted to the server.

7. The system of claim 6, wherein the data push module further includes a user state profile pus scheduler configured to schedule new user states determined from new the user contextual data to be transmitted to the server.

8. The system of claim 1, wherein the plurality of server adaptors is anyone of an Internet Message Access Protocol adaptor, Mail provider application programming interface (API) adaptors, CalDAV adaptors, Calendar Provider API adaptors, or Organizer Provider API adaptors.

9. The system of claim 1, wherein the server analysis engine further includes a user behavior analyzer module and a user state analyzer module.

10. The system of claim 9, wherein the user behavior analyzer continuously analyzes the second user contextual data to generate the user behavior data and build corresponding user behavior profiles.

11. The system of claim 9, wherein the user state analyzer module continuously analyzes the second user contextual data to generate the second user states data.

12. The system of claim 1, wherein the notification module includes a notification scheduler and a notification reschedule.

13. The system of claim 12, wherein the notification rescheduler reviews and updates priority and schedule of existing notifications based on the updated second user state data and further reschedules notifications.

14. A method of prioritizing and scheduling notifications to a user comprising:

collecting a first user contextual data from a plurality of user devices corresponding to a user, wherein each of the plurality of user devices includes a plurality of user device adaptors; and a second user contextual data from a plurality of server adaptors, both of which are configured to regularly collect user contextual data;

combining the first user contextual data and the second contextual data;

analysing the combined user contextual data to generate a user behaviour data and a user states data;

storing the combined user contextual data, the user behaviour data and the user states data;

updating the combined user contextual data, the user behaviour data and the user states data based on updated first user contextual data and updated second contextual data regularly; and prioritizing and scheduling the notifications to the plurality of user devices based on updated user behaviour data and user states data.

15. The method of claim 14, wherein the user states data includes a user schedule, a user location data, a user body condition data, or a user activity data.

16. The method of claim 15, wherein the user behavior data includes notification reading behavior of the user.

17. The method of claim 16, wherein notification reading behavior is based on anyone or a combination of topics of messages that the user is likely to read in a specific time, location and device, senders of messages that the user is likely to read in a specific time, location and device, topics of messages that the user is likely to ignore in a specific time, location and device, senders of messages that the user is likely to ignore in a specific time, location and device, topics of messages that the user is likely to respond in a specific time, location and device, and senders of messages that the user is likely to respond in a specific time, location and device.

18. The method of claim 14, wherein the method further includes rescheduling of existing notifications based on changes in the user states data.

19. The method of claim 14, wherein the method further includes receiving a client user states data from the plurality of user devices.

20. The method of claim 19, wherein the method further includes updating the user states data with the client user states data.

* * * * *